(12) United States Patent
Hamahata

(10) Patent No.: US 6,907,873 B2
(45) Date of Patent: Jun. 21, 2005

(54) FILTER CONTROL METHOD AND DEVICE

(75) Inventor: Toshihiro Hamahata, Saitama (JP)

(73) Assignee: Bosch Automotive Systems Corporation (JP)

( * ) Notice: Subject to any disclaimer, the term of this patent is extended or adjusted under 35 U.S.C. 154(b) by 0 days.

(21) Appl. No.: 10/491,993

(22) PCT Filed: Aug. 8, 2003

(86) PCT No.: PCT/JP03/10128

§ 371 (c)(1),
(2), (4) Date: Apr. 7, 2004

(87) PCT Pub. No.: WO2004/015249

PCT Pub. Date: Feb. 19, 2004

(65) Prior Publication Data

US 2004/0260452 A1 Dec. 23, 2004

(30) Foreign Application Priority Data

Aug. 9, 2002 (JP) ........................................ 2002-233733

(51) Int. Cl.⁷ ............................. F01N 3/02; F02D 45/00
(52) U.S. Cl. ...................... 123/676; 701/108; 60/286; 60/295; 60/297; 60/311
(58) Field of Search ................................ 123/672, 676; 701/108; 60/274, 286, 295, 297, 303, 311

(56) References Cited

U.S. PATENT DOCUMENTS 6,622,480 B2 * 9/2003 Tashiro et al. ................ 60/295

FOREIGN PATENT DOCUMENTS

| GB | 2 239 407 A | 7/1991 | |
|---|---|---|---|
| JP | 3-199616 | 8/1991 | |
| JP | 7-317529 | 12/1995 | |
| JP | 2000-193825 | 7/2000 | |
| JP | 2004-76589 | * 3/2004 | ............. F01N/3/02 |

* cited by examiner

Primary Examiner—Hai Huynh
(74) Attorney, Agent, or Firm—Connolly, Bove, Lodge & Hutz LLP

(57) ABSTRACT

Increase in quantity of particulates during a prescribed time period is acquired as first difference data (DX) that is based on pressure differential ΔP across a filter (32) and derived from first estimation data (D2) obtained from a first estimation calculator (52) and is simultaneously acquired as second difference data (DY) that is based on integration of the quantity of particulate generation per unit time and derived from second estimation data (D3) obtained from a second estimation calculator (53), and the second estimation data (D3) is corrected using correction data (D4) calculated from the first and second difference data (DX, DY) to acquire corrected second estimation data (D6). A discriminator (73) determines which of the first estimation data (D2) and corrected second estimation data (D6) is suitable data and the regeneration control of the filter is conducted using the so-selected estimation data (Q).

14 Claims, 3 Drawing Sheets

FILTER CONTROL METHOD AND DEVICE

TECHNICAL FIELD

The present invention relates to a filter control method and system capable of suitably timed regeneration of a filter for trapping particulates contained in engine exhaust gas.

BACKGROUND ART

In recent years, various devices for after-treating diesel particulates have been developed for installation in the exhaust systems of diesel engines so as to curb dispersion of fine particles contained in diesel engine exhaust gas into the atmosphere. The exhaust gas treatment devices of this type in wide use are generally configured to use a filter for trapping particulates contained in the exhaust gas of a diesel engine. The filter for trapping particulates is configured to trap particulates by using a ceramic or metal filter element for separating the exhaust gas and particulates. Particulates trapped inside the filter therefore gradually accumulate until the filter ultimately becomes clogged and passage of exhaust gas becomes impossible.

The practice has therefore been to use a filter control system that estimates the quantity of particulates accumulated in the filter based on the pressure differential across the filter or by integrating the quantity of particulates generated by the engine per unit time based on an engine operating condition, and that performs engine operation control for increasing the exhaust gas temperature when the estimated quantity of particulates reaches a prescribed level, thereby burning the particulates and regenerating the filter.

In this type of filter, a phenomenon of accelerated oxidation arises at the zone of the particulates accumulated in the filter that is most exposed to high-temperature gas. It is said that this results in part of the layer of accumulated particulates being maintained in a state in which the exhaust gas can always pass easily, so that the rise in exhaust resistance in the filter stops and the level of the exhaust resistance stabilizes at a certain value, notwithstanding that accumulation of particulates continues at other parts of the filter. When such a phenomenon arises, increase in particulates cannot be detected by the conventional method based predominantly on differential detection, even when a large quantity of particulates accumulates in the filter. Since the timing of forced filter regeneration is therefore delayed, the regeneration starts at a quantity of particulates exceeding the allowable range of the filter, so that the oxidation reaction of the particulates progresses intensely and the filter is liable to suffer fusion damage.

On the other hand, in the case where an arrangement is adopted in which the quantity of particulates that the engine generates per unit time is calculated using map data measured beforehand in a standard engine and the quantity of accumulated particulates in the filter is estimated by integrating this value, a discrepancy arises between the quantity of particulates generated per unit time measured beforehand in the standard engine and the actual quantity of particulates generated, owing to, among others, difference between individual engines, properties of the fuel used, and degradation of the fuel injection nozzles and other components. In addition, since the accumulation quantity map used to estimate the quantity of accumulated particulates is based on the quantity of accumulated particulates measured with the engine in a normal operating state, the accumulated quantity cannot be accurately mapped during a transient operation state. As a result, there is a problem of it being difficult to estimate the quantity of accumulated particulates with high accuracy.

Thus, it has been hard to estimate the quantity of particulates accumulated in a filter with high accuracy and difficult to conduct filter regeneration at appropriate timing, and this has led to such inconveniences as fusion damage of the filter during regeneration and decrease in fuel efficiency.

An object of the present invention is to provide a filter control method and system that overcomes the foregoing problems of the prior art.

DISCLOSURE OF THE INVENTION

In order to achieve this object, the present invention provides a filter control method that estimates the quantity of particulates deposited in a filter for trapping diesel particulates based on pressure differential across the filter and/or on an integrated value obtained by integrating, with consideration to an engine operating condition, a given quantity of particulate generation per unit time, and conducts filter regeneration control, which filter control method is characterized in that it comprises a step of acquiring, based on the pressure differential across the filter, an increase in quantity of particulates during a prescribed period as a first particulate increase quantity and acquiring, based on the integrated value, a second particulate increase quantity, a step of deriving from the first and second particulate increase quantities correction data for correcting the integrated value, and a step of using the correction data to correct the integrated value to acquire a corrected integrated value, and in that it conducts regeneration control of the filter using the corrected integrated value or the pressure differential across the filter.

The present invention also provides a filter control system equipped with first calculation means for estimating the quantity of particulates accumulated in a filter for trapping diesel particulates based on pressure differential across the filter and second calculation means for estimating the quantity of accumulated particulates by integrating, with consideration to an engine operating condition, a given quantity of particulate generation per unit time, and conducts filter regeneration control based on the outputs of the first and second calculation means, which filter control system is characterized in that it comprises means for calculating, based on an output of the first calculation means, an increase in the quantity of accumulated particulates between two different given time points and outputting it as a first output and simultaneously calculating a second output based on an output of the second calculation means and outputting it, means responsive to the first and second outputs for deriving correction data for correcting the output of the second calculation means, and means for acquiring a corrected output by using the correction data to correct the output of the second calculation means, and in that it conducts regeneration control of the filter using the corrected output and the output of the first calculation means.

BEST MODE OF CARRYING OUT THE INVENTION

In order to explain the present invention in greater detail, it will now be explained with reference to the attached drawings.

Figure 1:
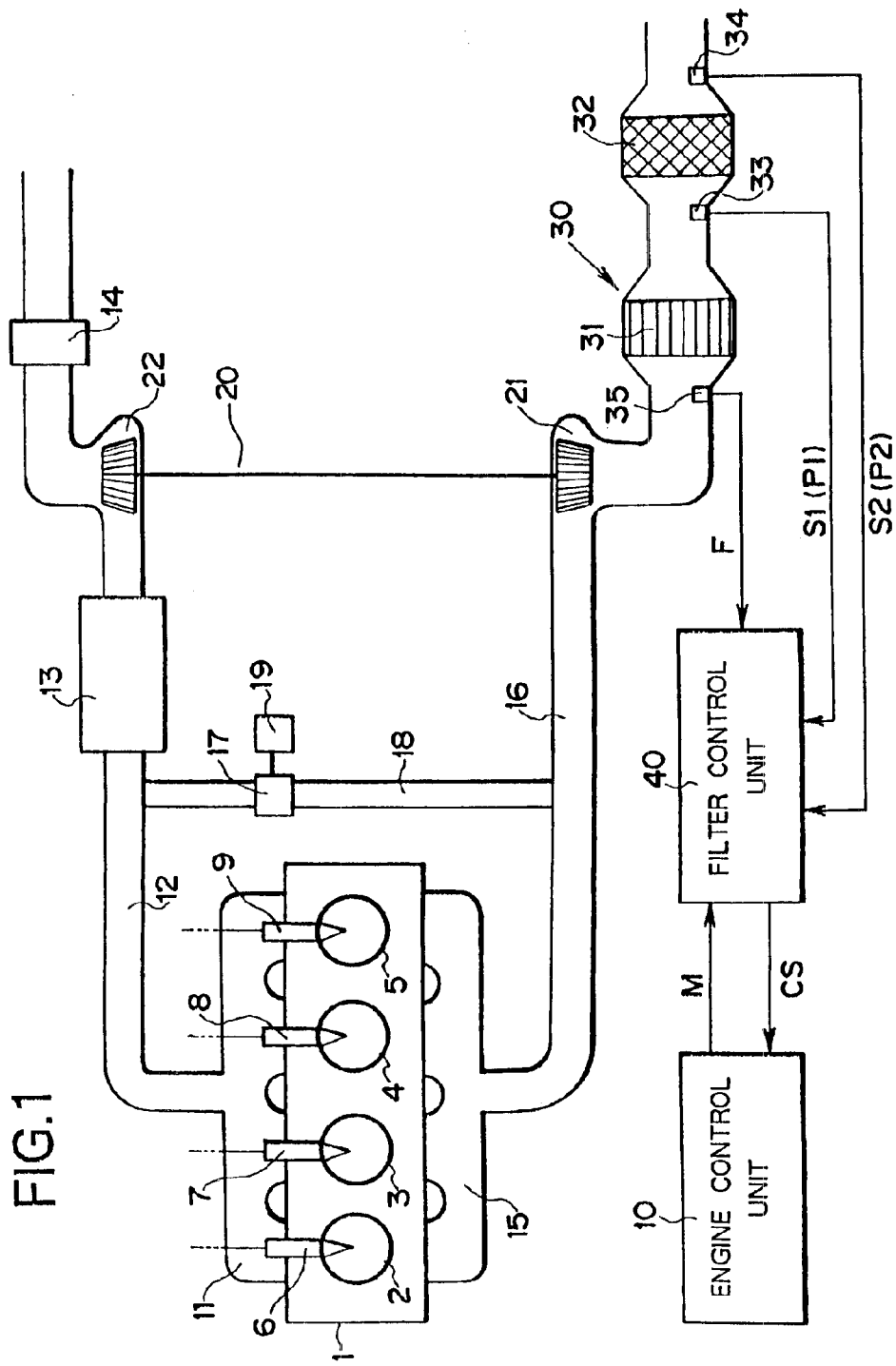
FIG. 1 is an overall schematic diagram showing an embodiment in the case of applying the present invention to control of a filter for after-treatment of the exhaust gas of a diesel engine.

FIG. 1 is an overall schematic diagram showing an embodiment in the case of applying the present invention to control of a filter for after-treatment of the exhaust gas of a diesel engine. Symbol 1 denotes a four-cylinder diesel engine 1, the cylinders 2–5 of which are provided with injectors 6–9, respectively. The operation of these injectors 6–9 is controlled by an engine control unit 10, using a known arrangement to inject a required amount of high-pressure fuel, at a required timing, into the corresponding cylinder.

An intake duct 12 connected to an intake manifold 11 is provided with an inter-cooler 13 and an air cleaner 14. An exhaust duct 16 connected to an exhaust manifold 15 is equipped with an exhaust gas after-treatment device 30.

An exhaust recirculation channel 18 provided with an EGR control valve 17 is provided between the intake duct 12 and the exhaust duct 16. The opening of the EGR control valve 17 is regulated by an actuator 19 controlled by the engine control unit 10. This forms an arrangement whereby part of the exhaust gas flowing in the exhaust duct 16 can be metered and returned to the intake manifold 11. Symbol 20 denotes an exhaust turbocharger, comprised of an exhaust turbine 21 disposed inside the exhaust duct 16 and a compressor 22 that is disposed inside the intake duct 12 and driven by the exhaust turbine 21.

The exhaust gas after-treatment device 30 includes an oxidation catalyst 31 and a filter 32 for trapping particulates, and is arranged so that exhaust gas flowing in the exhaust duct 16 flows first to the oxidation catalyst 31, and then flows to the filter 32. The oxidation catalyst 31 is configured by forming a washcoat layer of activated alumina or the like on the surface of a support constituted of, for example, honeycomb-structure cordierite or heat-resistant steel, and a catalyst activation component consisting of a noble metal such as platinum, palladium or rhodium is then imparted to the coated layer. The oxidation catalyst is configured to oxidize NO in the exhaust gas to produce $NO_2$, and to also oxidize HC and CO in the exhaust gas to produce O and $CO_2$.

As the filter 32 is used a so-called wallflow type honeycomb filter in which multiple cells are formed in parallel of porous cordierite or silicon carbide, with cells with sealed inlets alternating with cells with sealed outlets, or a fiber type filter comprising layers of ceramic fibers wrapped around a perforated stainless-steel tube. It traps particulates in the exhaust gas.

The inlet end (before) and outlet end (after) of the filter 32 are provided with a first pressure sensor 33 and a second pressure sensor 34, respectively, for detecting each exhaust gas pressure. A first pressure signal S1 indicating the exhaust gas pressure P1 at the inlet end of the filter 32 is output from the first pressure sensor 33, and a second pressure signal S2 indicating the exhaust gas pressure P2 at the outlet end of the filter 32 is output from the second pressure sensor 34. Symbol 35 denotes a flow rate sensor for detecting the flow rate of the exhaust gas flowing in the exhaust duct 16. An exhaust gas flow rate signal F from the flow rate sensor 35 is input to a filter control unit 40, together with the first pressure signal S1 and second pressure signal S2.

Here, instead of detecting the exhaust flow rate by the flow rate sensor 35, it is possible to obtain the flow rate of the exhaust gas by calculation from the intake air quantity, injection quantity, exhaust gas temperature and exhaust gas pressure. In this case, the volumetric flow rate can be calculated by using the relationship $$PV=nRT$$

(where P: Pressure, V: Volume, T: Temperature, nR: Gas constant) to integrate volume over time.

The filter control unit 40 is a unit that estimates the quantity of accumulated particulates trapped by the filter 32 and, based on the estimation result, conducts engine control for regenerating the filter 32.

Figure 2:
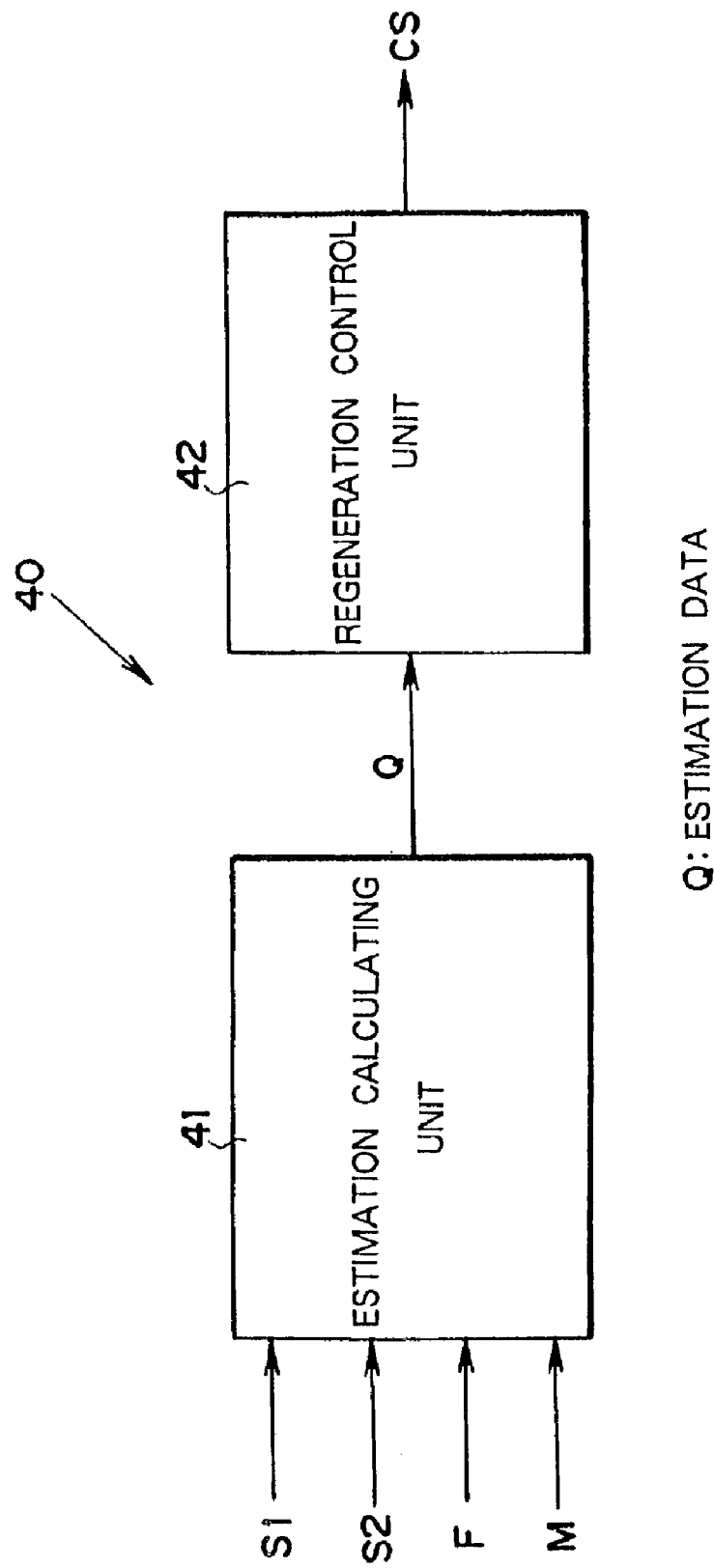
FIG. 2 is a block diagram showing the general configuration of the filter control unit of FIG. 1.

FIG. 2 is a block diagram showing the configuration of the control unit 40. The control unit 40 is equipped with an estimation calculating unit 41 that carries out calculations for estimating the quantity of particulates accumulated in the filter 32 and outputs estimation data Q indicating the estimation result and a regeneration control unit 42 that controls regeneration of the filter 32 based on the estimation data Q. The estimation calculating unit 41 is supplied with the first pressure signal S1, the second pressure signal S2, exhaust gas flow rate signal F, and engine operation data M indicating an operating condition of the diesel engine 1.

Figure 3:
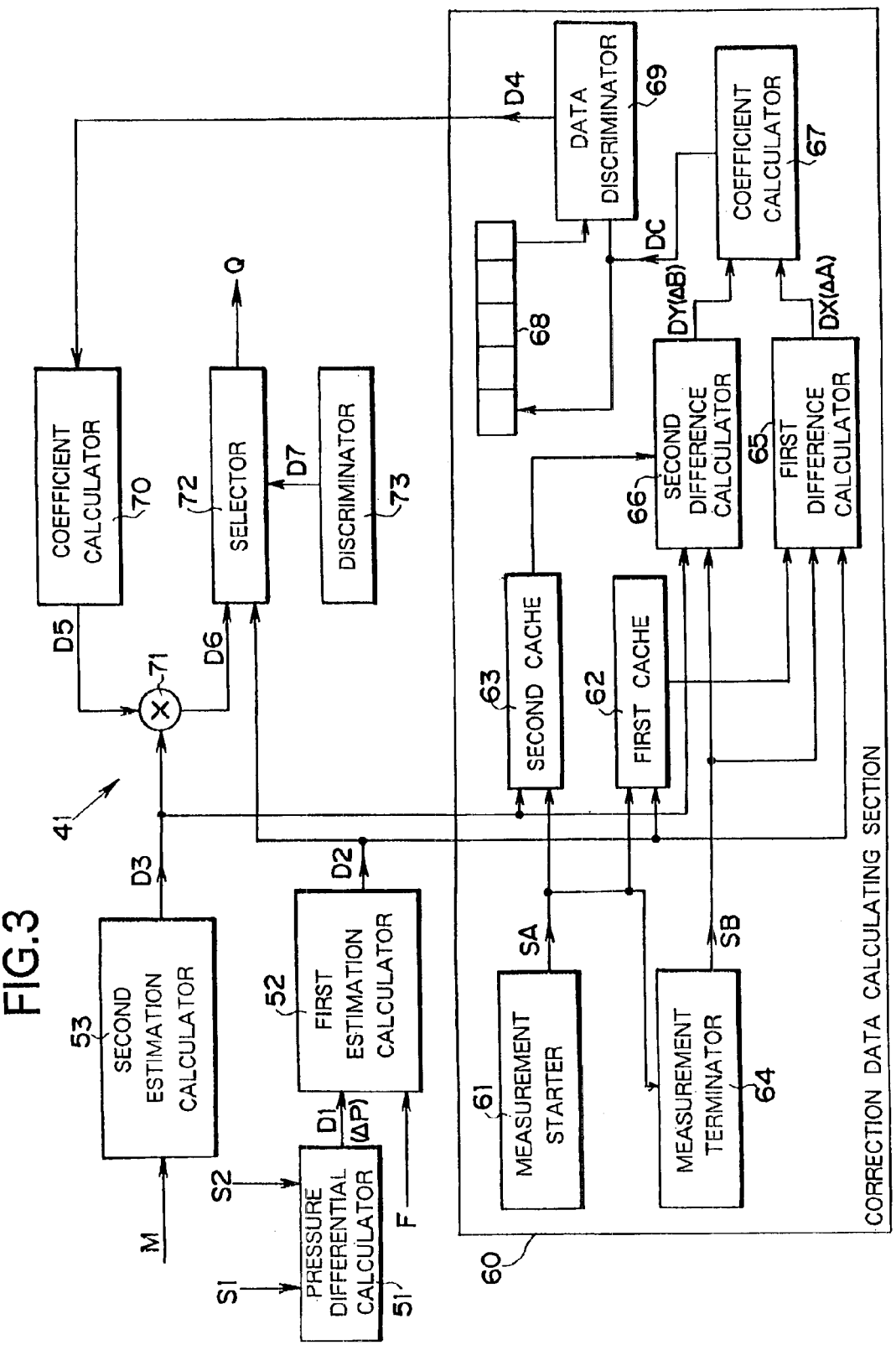
FIG. 3 is a detailed block diagram of the estimation calculating unit of FIG. 2.

FIG. 3 is a detailed block diagram of the estimation calculating unit 41. 51 is a pressure differential calculator responsive to the first pressure signal S1 and second pressure signal S2 for calculating pressure differential $\Delta P$ ($=P1-P2$) across the filter 32 and outputting pressure differential data D1 indicating the calculation result. The pressure differential data D1 is input to a first estimation calculator 52 to which the exhaust gas flow rate signal F is input. Here the quantity of particulates accumulated in the filter 32 is estimated from the pressure differential $\Delta P$ and the exhaust flow rate indicated by the exhaust gas flow rate signal F, and first estimation data D2 indicating the estimation result is output.

On the other hand, a second estimation calculator 53 is configured to conduct processing, with consideration to the engine operation data M indicating the instantaneous operating point of the diesel engine 1, for integrating data indicating a given quantity of particulate generation per unit time stored in the second estimation calculator 53 beforehand and to output the value obtained by the integration processing as second estimation data D3 indicating an estimated value of the quantity of accumulated particulates. As the data indicating the quantity of particulate generation per unit time used in the second estimation calculator 53, it is possible to appropriately utilize a value acquired in advance by an experiment or the like. The arrangement in which data of given quantity of particulate generation per unit time is integrated taking an engine operating condition indicated by engine operation data M into consideration and estimating the quantity of accumulated particulates therefrom is itself known to the art. Explanation of the detailed configuration of the second estimation calculator 53 will therefore be omitted here.

The block denoted by symbol 60 is a correction data calculating section for, during a certain prescribed operating period of the diesel engine 1, calculating an increase $\Delta A$ in the quantity of accumulated particulates based on first estimation data D2 and an increase $\Delta B$ in the quantity of accumulated particulates based on second estimation data D3, comparing $\Delta A$ and $\Delta B$, and, based on the result of the comparison, calculating correction data for correcting the second estimation data D3 for deriving a more accurate particulate accumulation estimation value.

The correction data calculating section 60 will be explained. First and second caches 62, 63 operate in response to a start signal SA from a measurement starter 61 to hold in the first cache 62 and the second cache 63, respectively, the values D2A and D3A of the first estimation data D2 and second estimation data D3 at the time the start signal SA was output. The measurement starter 61 can, for example, be configured to output the start signal SA at prescribed regular time intervals.

A measurement terminator 64 is configured as a timer that operates in response to the start signal SA for outputting a terminate signal SB upon passage of a prescribed period from the output of the start signal SA. The terminate signal SB is input to a first difference calculator 65 and a second difference calculator 66. Instead of the configuration using a timer, a configuration can be adopted that outputs the terminate signal SB when, after output of the start signal SA, the detected increase in accumulated particulates becomes a prescribed value.

The first difference calculator 65 is supplied with the value D2A held in the first cache 62. At the time the terminate signal SB is output, the first difference calculator 65 fetches the value D2B of the first estimation data D2 and calculates the difference ΔA between the value D2B and the value D2A. The difference ΔA is therefore the value estimated by the first estimation calculator 52 regarding the quantity of particulates accumulated in the filter 32 during a prescribed time period T0 from the output of the start signal SA to the output of the terminate signal SB.

Similarly, the second difference calculator 66 is supplied with the value D3A held in the second cache 63. At the time the terminate signal SB is output, the second difference calculator 66 fetches the value D3B of the second estimation data D3 and calculates the difference ΔB between the value D3B and the value D3A. The difference ΔB is therefore the value estimated by the second estimation calculator 53 regarding the quantity of particulates accumulated in the filter 32 during the prescribed time period T0 from the output of the start signal SA to the output of the terminate signal SB.

First difference data DX indicating the difference ΔA is output from the first difference calculator 65 and second difference data DY indicating the difference ΔB is output from the second difference calculator 66. The first difference data DX and second difference data DY are input to a coefficient calculator 67, which performs the calculation ΔA/ΔB and outputs coefficient data DC indicating the calculation result.

The coefficient data DC is sent to a coefficient data memory 68. The coefficient data memory 68 is a shift register type memory in which earlier coefficient data are sequentially shifted and stored every time the coefficient data DC is output from the coefficient calculator 67. Here it is configured to store the latest five pieces of coefficient data.

A data discriminator 69 is supplied with the coefficient data DC from the coefficient calculator 67 and the coefficient data stored in the coefficient data memory 68 five steps earlier, and discriminates the suitability of the coefficient data DC from the coefficient calculator 67. In this embodiment, the data discriminator 69 calculates the moving average of the coefficient data based on the coefficient data obtained before the coefficient data DC, compares the magnitudes of the moving average value and the coefficient data DC from the coefficient calculator 67, judges that the value of the coefficient data DC from the coefficient calculator 67 is suitable when the difference is equal to or less than a prescribed value, and outputs the latest coefficient data DC as correction data D4. On the other hand, when the difference is larger than the prescribed value, it is judged that the value of the latest coefficient data DC is unsuitable and data based on the moving average calculated in the data discriminator 69, e.g., the instantaneous moving average value, is output as the correction data D4.

In other words, the correction data calculating section 60 is configured to calculate the ratio of the particulate increase during a prescribed period estimated by the first estimation calculator 52 to the particulate increase during the prescribed period estimated by the second estimation calculator 53 and output the correction data D4 based on this ratio.

A feature of the first estimation calculator 52 is that because it estimates the quantity of accumulated particulates based on pressure differential across the filter 32, it is able to estimate the quantity of accumulated particulates with quite good accuracy when the filter 32 is new or was just regenerated. As was explained earlier, however, after a certain quantity of particulates have accumulated in the filter 32, a process comes into play by which the particulates are partially oxidized by the exhaust gas, so that the level of pressure differential does not change much despite continuing accumulation of particulates, making accurate estimation of the quantity of accumulated particulates impossible.

On the other hand, the estimation by the second estimation calculator 53 is done by storing in advance data relating to the quantity of particulates generated by the engine per unit time and integrating this data with consideration to the operating condition, so that the data indicating the quantity of particulates generated per unit time may sometimes deviate from the actually generated quantity.

Estimation of the quantity of accumulated particulates is therefore actually conducted under the same condition in the first estimation calculator 52 and second estimation calculator 53 and, by comparing the results, a correction coefficient for the value of the second estimation data D3 from the second estimation calculator 53 is calculated in the correction data calculating section 60. The calculation in the correction data calculating section 60 for deriving the correction data D4 is therefore preferably carried out under a condition that enables the estimation in the first estimation calculator 52 to be conducted relatively accurately. For this, the timing of the decisions to start and terminate in the measurement starter 61 and measurement terminator 64 are preferably defined to conduct calculation for deriving the correction data D4 within a prescribed period immediately after replacing the filter 32 with a new one or within a period immediately after regenerating the filter 32. These are periods during which accumulation of particulates increases steadily.

The correction data D4 from the data discriminator 69 is sent to a coefficient calculator 70, which calculates a correction coefficient for the second estimation data D3. The so-acquired correction coefficient data D5 is sent to a multiplier 71, which multiplies the second estimation data D3 by the correction coefficient data D5 to obtain corrected second estimation data D6. A configuration is preferably adopted that executes compensate/save computation at least once every time the filter 32 is regenerated.

The corrected second estimation data D6 and first estimation data D2 are sent to a selector 72 and discrimination data D7 from a discriminator 73 is used to select whichever of the corrected second estimation data D6 and first estimation data D2 is appropriate, whereafter the selected data is output without modification as the estimation data Q indicating the estimated value of the quantity of accumulated particulates.

In this embodiment, the discriminator 73 is configured to discriminate whether any of the following apply:

(1) The estimated value of the quantity of accumulated particulates is equal to or less than a prescribed value;
(2) The value of the pressure differential ΔP is equal to or less than a prescribed value;
(3) The range of variation of the pressure differential ΔP is equal to or greater than a prescribed value;
(4) The second pressure sensor 34 or the second pressure sensor 34 is faulty. It is further configured to select the corrected second estimation data D6 when any of (1)–(4) apply, and otherwise to select the first estimation data D2.

Owing to the foregoing configuration of the filter control unit 40, the estimation calculating unit 41 can define as the estimation data Q whichever data is the more suitable data: the first estimation data D2 based on the pressure differential ΔP across the filter 32 or the corrected second estimation data D6 acquired by using the correction data D4 derived in the correction data calculating section 60 to correct the second estimation data D3 acquired by integration-based processing of a given quantity of particulate generation per unit time. The estimation data Q is therefore a very much more accurate particulate accumulation estimation value than heretofore.

Another possibility is to check from the time-course change in the pressure differential whether the rise in pressure differential has saturated and when it is found to have saturated to conduct filter regeneration control based on the integrated value thereafter.

The regeneration control unit 42 is responsive to the estimation data Q for discriminating whether the quantity of accumulated particulates has exceeded a prescribed value, and output the regeneration signal CS for input to the engine control unit 10 when it is found from the estimation data Q that the quantity of accumulated particulates has exceeded the prescribed value. The engine control unit 10 is responsive to the regeneration signal CS for executing injection timing retard control required for regenerating the filter 32, thereby increasing the temperature of the exhaust gas to burn the particulates accumulated in the filter 32 and thus carry out filter 32 regeneration.

As explained in the foregoing, the estimation data Q obtained from the estimation calculating unit 41 accurately represents the quantity of particulates accumulated in the filter 32, so that regeneration control of the filter 32 can be suitably performed and damage to the filter 32 during regeneration prevented. Moreover, while prevention of filter fusion damage by conducting regeneration control at a stage where the quantity of accumulated particulates is judged not to be so large markedly degrades fuel economy owing to the filter regeneration control, the improved detection accuracy in the present system minimizes the adverse effect on fuel consumption.

As set forth above, the good accuracy at which the quantity of particulates accumulated in the filter can be estimated enables suitable regeneration control of the filter, whereby damage to the filter can be effectively prevented during regeneration and fuel consumption for filter regeneration can be held to a small level to realize improved fuel economy.

INDUSTRIAL APPLICABILITY

As set out in the foregoing, the filter control method and system according to the present invention are useful for conducting suitably timed filter regeneration.

What is claimed is:

1. A filter control method that estimates the quantity of particulates deposited in a filter for trapping diesel particulates based on pressure differential across the filter and/or on an integrated value obtained by integrating, with consideration to an engine operating condition, a given quantity of particulate generation per unit time, and conducts filter regeneration control, which filter control method is characterized in that it comprises:

a step of acquiring, based on the pressure differential across the filter, an increase in quantity of particulates during a prescribed period as a first particulate increase quantity and acquiring, based on the integrated value, a second particulate increase quantity;

a step of deriving from the first and second particulate increase quantities correction data for correcting the integrated value; and a step of using the correction data to correct the integrated value to acquire a corrected integrated value, and in that it conducts regeneration control of the filter using the corrected integrated value or the pressure differential across the filter.

2. A filter control method as claimed in claim 1, wherein the first and second particulate increase quantities are acquired within a prescribed period when accumulation of particulates rises steadily.

3. A filter control method as claimed in claim 1, wherein, in the step of deriving the correction data, coefficient data is calculated from a ratio between the first and second particulate increase quantities, and either the coefficient data or a moving average value of the coefficient data is, based on a coefficient data suitability judgment and the judgment result, adopted as the correction data.

4. A filter control method as claimed in claim 3, wherein calculation of the coefficient data is executed at least once every time the filter is regenerated.

5. A filter control method as claimed in claim 1, further comprising a discrimination step for deciding which of the corrected integrated value and the pressure differential across the filter to use for the regeneration control.

6. A filter control method as claimed in claim 5, wherein it is discriminated in the discrimination step whether:

(1) The estimated value of the quantity of accumulated particulates is equal to or less than a prescribed value;

(2) The value of the pressure differential ΔP is equal to or less than a prescribed value;

(3) The range of variation of the pressure differential ΔP is equal to or greater than a prescribed value;

(4) The second pressure sensor 34 or the second pressure sensor 34 is faulty;

and selects the corrected integrated value data only when any of (1)–(4) apply.

7. A filter control method as claimed in claim 1, wherein whether rise in pressure differential has saturated is checked from time-course change in the pressure differential across the filter and when the rise in pressure differential is found to have saturated, filter regeneration control is conducted based on the integrated value thereafter.

8. A filter control system equipped with first calculation means for estimating the quantity of particulates accumulated in a filter for trapping diesel particulates based on pressure differential across the filter and second calculation means for estimating the quantity of accumulated particles by integrating, with consideration to an engine operating condition, a given quantity of particulate generation per unit time, and conducts filter regeneration control based on the outputs of the first and second calculation means, which filter control system is characterized in that it comprises:

means for calculating, based on an output of the first calculation means, an increase in the quantity of accumulated particulates between two different given time points and outputting it as a first output and simultaneously calculating a second output based on an output of the second calculation means and outputting it;

means responsive to the first and second outputs for deriving correction data for correcting the output of the second calculation means; and means for acquiring a corrected output by using the correction data to correct the output of the second calculation means, and in that it conducts regeneration control of the filter using the corrected output and the output of the first calculation means.

9. A filter control system as claimed in claim 8, wherein the first and second outputs are acquired within a prescribed period when accumulation of particulates rises steadily.

10. A filter control system as claimed in claim 8, wherein, in the means for deriving the correction data, coefficient data is calculated from a ratio between the first and second outputs, and either the coefficient data or a moving average value of the coefficient data is, based on a coefficient data suitability judgment and the judgment result, adopted as the correction data.

11. A filter control system as claimed in claim 10, wherein calculation of the coefficient data is executed at least once every time the filter is regenerated.

12. A filter control system as claimed in claim 8, further comprising a discrimination means for deciding which of the corrected output and the output of the first calculation means to use for the regeneration control.

13. A filter control system as claimed in claim 12, wherein it is discriminated in the discrimination means whether:

(1) The estimated value of the quantity of accumulated particulates is equal to or less than a prescribed value;

(2) The value of the pressure differential ΔP is equal to or less than a prescribed value;

(3) The range of variation of the pressure differential ΔP is equal to or greater than a prescribed value;

(4) The second pressure sensor 34 or the second pressure sensor 34 is faulty;

and selects the corrected output only when any of (1)–(4) apply.

14. A filter control system as claimed in claim 8, wherein whether rise in pressure differential has saturated is checked from time-course change in the pressure differential across the filter and when the rise in pressure differential is found to have saturated, filter regeneration control is conducted based on the output of the first calculation means thereafter.

* * * * *